March 1, 1927.
J. R. KERNS
1,619,520
ILLUMINATED LICENSE TAG HOLDER FOR AUTOMOBILES
Filed June 30, 1924
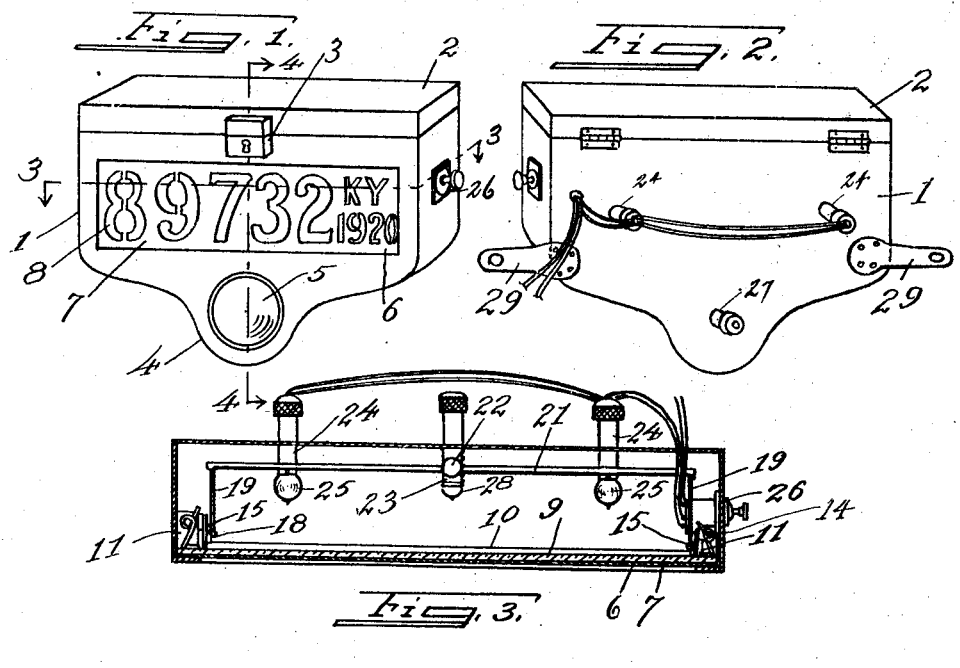
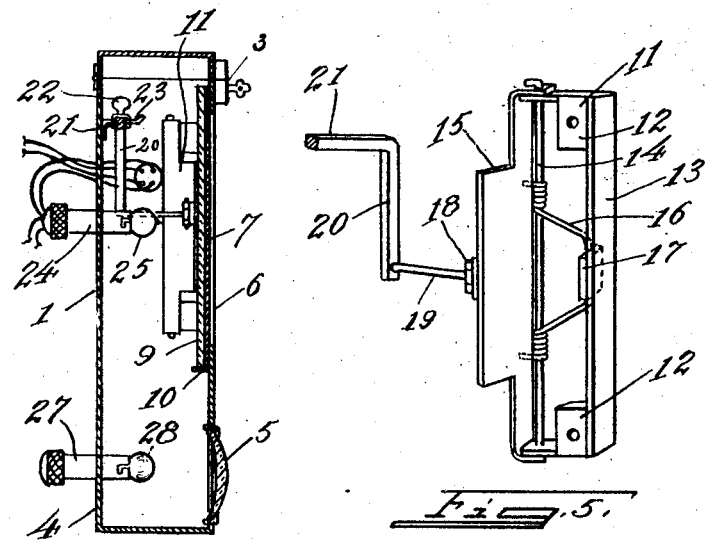
INVENTOR:
John R. Kerns,
BY Arthur H. Ewald,
ATTORNEY.

Patented Mar. 1, 1927.

1,619,520

UNITED STATES PATENT OFFICE.

JOHN R. KERNS, OF COVINGTON, KENTUCKY.

ILLUMINATED LICENSE-TAG HOLDER FOR AUTOMOBILES.

Application filed June 30, 1924. Serial No. 723,121.

My invention relates to illuminated license tags and particularly to the provision of an improved holder for same.

The principal object of this invention is to provide a license tag of such construction that the same may be illuminated at night and therefore be of high visibility.

A further object of the invention is to provide improved means for holding and mounting a license tag of the nature mentioned upon the rear portion of a motor vehicle. Another object of the invention is to provide mechanism in a device of the character mentioned wherein license tags, while readily removable, are securely held, thus preventing rattling and ready displacement during the operation of the vehicle.

Further objects will appear from the following detailed description of my invention:

In the drawings:

Figure 1 is a perspective of the device from the front.

Figure 2 is a rear perspective thereof.

Figure 3 is a section on line 3—3 of Figure 1.

Figure 4 is a section on line 4—4 of Figure 1.

Figure 5 is a perspective of the tag securing means.

The numeral 1 indicates a casing of box-like construction, the same being provided with a hinged cover 2 secured at front by means of a lock 3. The casing 1 is provided with a lower extension 4 for a red tail light lens 5.

The front wall of the casing is provided with an open panel 6 for exposure of the license tag. The tag consists preferably of a stenciled metal or other opaque plate 7 provided with the usual number and other indicia 8. In back of the plate 7 is a glass or other translucent plate 9. The plates 7 and 9 rest on a shoulder or shelf 10 secured on the inside wall of the casing 1 below the open panel 6.

Mounted on the end walls of the casing are brackets 11, the same being provided with perforated corner plates 12 by means of which the same are secured to the end walls by the use of rivets or bolts. When thus secured the members 13 of the bracket are vertically disposed in a parallel plane with the front wall of the casing so as to form grooves in connection with the front wall between which the plates 7 and 9 are inserted.

Pivotally mounted on a rod 14 in each of the brackets is a locking plate 15, tension springs 16 coiled around the rods 14 and interposed between the rear sides of plates 15 and lugs 17 on the members 13, normally hold the plates 15 in the position shown in Figure 3, in which the front edges thereof are adapted to abut against the rear side of the translucent plate 9 to secure the said plate and the license plate 7 firmly in position. Hingedly secured at 18 to the plates 15, near the front edges thereof, are links 19, the free ends of which are secured to downward extensions 20 of a cross-bar 21. Secured to the middle of the bar 21 is an operating knob 22 by means of which the bar may be moved backwardly and forwardly in the case so as to operate the plates 15 for the purpose of releasing the plates 7 and 9. A leaf spring 23 engages frictionally against the upper side of the bar 21 so as to secure the same against movement when not manually operated.

Mounted in the rear wall of the casing are sockets 24 for light bulbs 25 arranged to illuminate the license tags. A switch 26 controls the illumination of the bulbs 25. In the lower extension 4 of the casing is a socket 27 for a bulb 28 which illuminates the red lens 5. Brackets 29, of any suitable construction, are provided for securing the device to the vehicle.

From the foregoing description, the nature and operation of the present invention will be apparent to those skilled in the art.

The casing is secured in appropriate position on the rear of the vehicle by means of brackets 29. When thus in position suitable license tags may be inserted behind the open panel 6 by moving the thumb button 22 toward the rear of the casing, which releases the plates 15, the plate 13 being spaced sufficiently away to provide a slot for tags of varying thickness. When the button 22 is released the springs 16 return the plates in position, shown in Figure 3, so as to secure the plates rigidly in position, said plates 15 rotating about the pivotal rods 14 so as to bring the front edges of the plates against the rear side of the tag.

Preferably, the translucent plate 9 is of some color contrasting sharply with the color of the plate 7 so that the license number is visible by day-light. At night the bulbs 25 are illuminated by the operation of the switch 26 and the license number is thus rendered visible at great distances. It will be noted that by reason of the placing of the switch 26 on the casing it is necessary for the driver to leave his position in the vehicle for the purpose of turning out the license lights. It is thus impossible for the operator of a vehicle to put out his license illuminating lights after an accident for the purpose of escaping detection.

It will be understood that various modifications in details of construction may be made without departing from the spirit and scope of the present invention as defined in the appended claims.

Having thus fully described my invention, what I claim as new and desire to secure by Letters Patent is:

1. A device of the character specified comprising a casing, an open panel in said casing, a plate arranged to be mounted in said casing behind said open panel, said plate being provided with open indicia, a translucent plate arranged to be mounted behind said panel and first plate, means for the illumination of said plates, a bracket at each end of said casing, a plate pivotally mounted in each of said brackets, said plates being adapted to bear against the license and translucent plates for the purpose of securing them in position, means for holding the retaining plates normally in locking position under tension, and means for operating the retaining plates simultaneously to release the translucent and license plates.

2. A device of the character specified comprising a casing, an open panel in said casing, a plate arranged to be mounted in said casing behind said open panel, said plate being provided with open indicia, a translucent plate arranged to be mounted behind said panel and first plate, electric bulbs for the illumination of said plates, a bracket at each end of said casing, a plate pivotally mounted in each of said brackets, said plates being adapted to bear against the license and translucent plates for the purpose of securing them in position, means for holding the retaining plates normally in locking position under tension, rods hingedly secured to said retaining plates, a bar, the free ends of said rods being connected to opposite ends of said bar whereby said bar is adapted to operate the retaining plates simultaneously, and means for frictionally retaining said bar in position.

3. A device of the character specified comprising a casing, an open panel in said casing, a plate arranged to be mounted in said casing behind said open panel, said plate being provided with open indicia, a translucent plate arranged to be mounted behind said panel and first plate, electric bulbs for the illumination of said plates, a bracket at each end of said casing, a plate pivotally mounted in each of said brackets, said plates being adapted to bear against the license and translucent plates for the purpose of securing them in position, means for holding the retaining plates normally in locking position under tension, means for operating the retaining plates simultaneously to release the translucent and license plates, and a switch mounted on said casing for controlling the illumination of said bulbs.

4. A device of the character specified comprising a casing, an open panel in said casing, a plate arranged to be mounted in said casing behind said open panel, said plate being provided with open indicia, a translucent plate arranged to be mounted behind said panel and first plate, electric bulbs for the illumination of said plates, a bracket at each end of said casing, a plate pivotally mounted in each of said brackets, said plates being adapted to bear against the license and translucent plates for the purpose of securing them in position, means for holding the retaining plates normally in locking position under tension, rods hingedly secured to said retaining plates, a bar, the free ends of said rods being connected to opposite ends of said bar, whereby said bar is adapted to operate the retaining plates simultaneously, means for frictionally retaining said bar in position, and a switch mounted on said casing for controlling the illumination of said bulbs.

JOHN R. KERNS.